United States Patent
Knipfer et al.

(10) Patent No.: US 7,752,229 B2
(45) Date of Patent: Jul. 6, 2010

(54) REAL-TIME IDENTIFICATION OF SUB-ASSEMBLIES CONTAINING NESTED PARTS

(75) Inventors: Ivory Wellman Knipfer, Rochester, MN (US); Jeffrey George Komatsu, Kasson, MN (US); William Robert Taylor, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 11/627,626

(22) Filed: Jan. 26, 2007

(65) Prior Publication Data

US 2008/0183723 A1    Jul. 31, 2008

(51) Int. Cl.
    *G06F 17/30*    (2006.01)
(52) U.S. Cl. .................. 707/797; 707/806
(58) Field of Classification Search .......... 707/100–101
    See application file for complete search history.

(56) References Cited

U.S. PATENT DOCUMENTS

| 5,701,400 A | 12/1997 | Amado |
| 6,654,760 B2 * | 11/2003 | Baskins et al. ............... 707/101 |
| 6,978,271 B1 * | 12/2005 | Hoffman et al. ............ 707/101 |
| 7,047,237 B2 | 5/2006 | Suzuki et al. |
| 7,065,420 B1 | 6/2006 | Philpott et al. |
| 7,197,502 B2 * | 3/2007 | Feinsmith ................... 707/100 |
| 7,415,472 B2 * | 8/2008 | Testa .......................... 707/100 |
| 2002/0007361 A1 | 1/2002 | Esaki et al. |
| 2002/0069192 A1 | 6/2002 | Aegerter |
| 2003/0187534 A1 | 10/2003 | Suzuki et al. |
| 2004/0088307 A1 | 5/2004 | Von Bergen et al. |

* cited by examiner

*Primary Examiner*—Mohammad Ali
*Assistant Examiner*—Huawen Peng
(74) *Attorney, Agent, or Firm*—Yee & Associates, P.C.; Steven L. Bennett

(57) ABSTRACT

A computer implemented method, apparatus, and computer program product for managing an ancestry tree. An order to build a product is received. The ancestry tree is created. The ancestry tree comprises a set of nodes, where each node represents a part of the product. A request to determine a higher level sub-assembly containing a specific part is received. The node of the specific part is located in the ancestry tree. An ancestor pointer in the node of the specific part is returned. The ancestor pointer indicates a higher level sub-assembly containing the part.

18 Claims, 13 Drawing Sheets

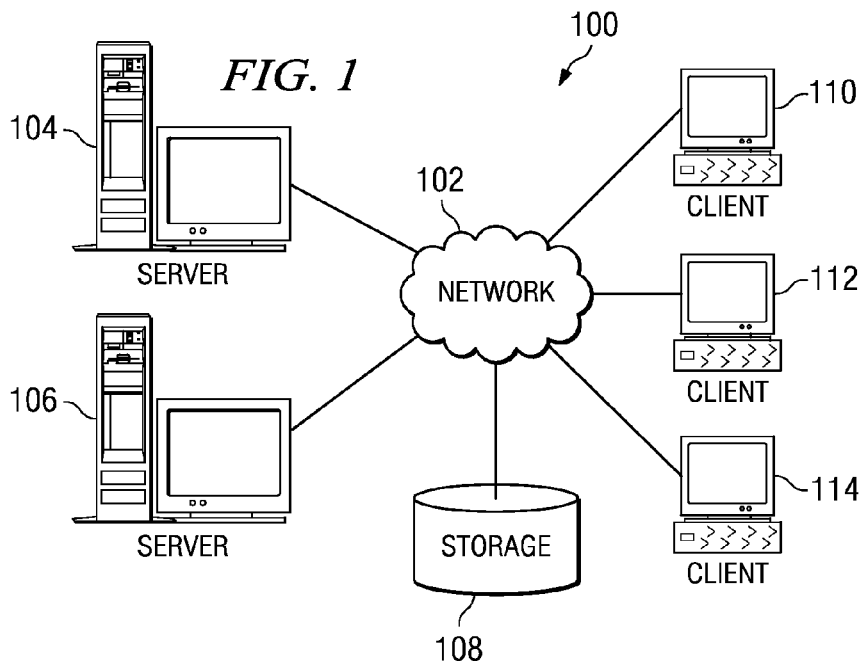
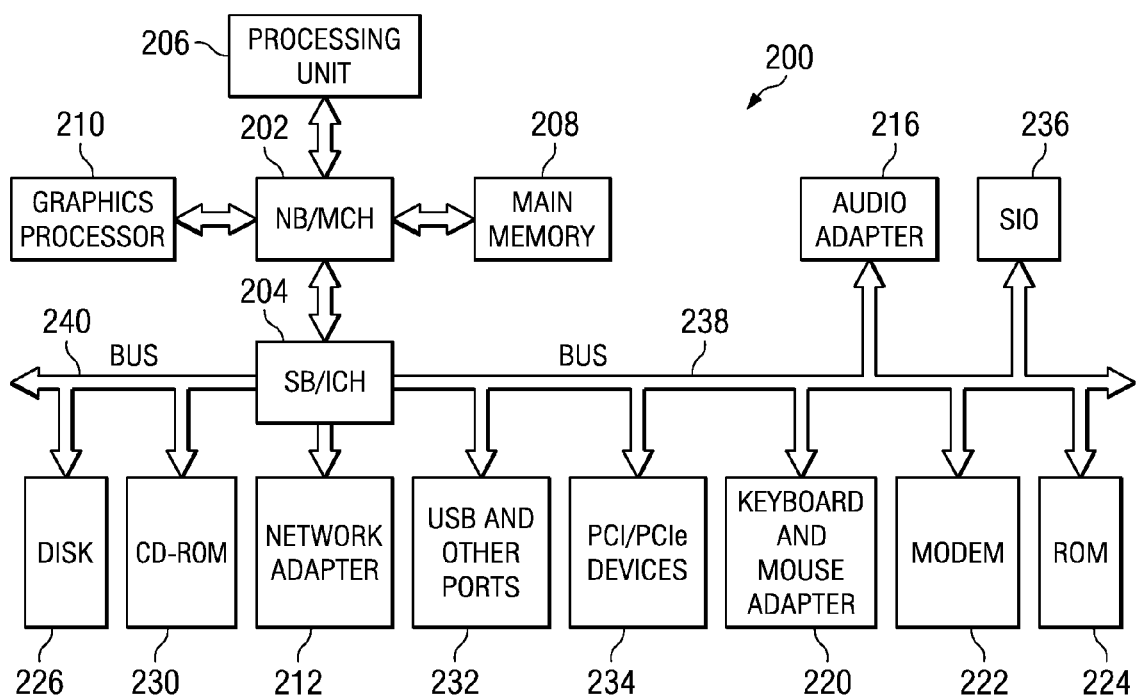

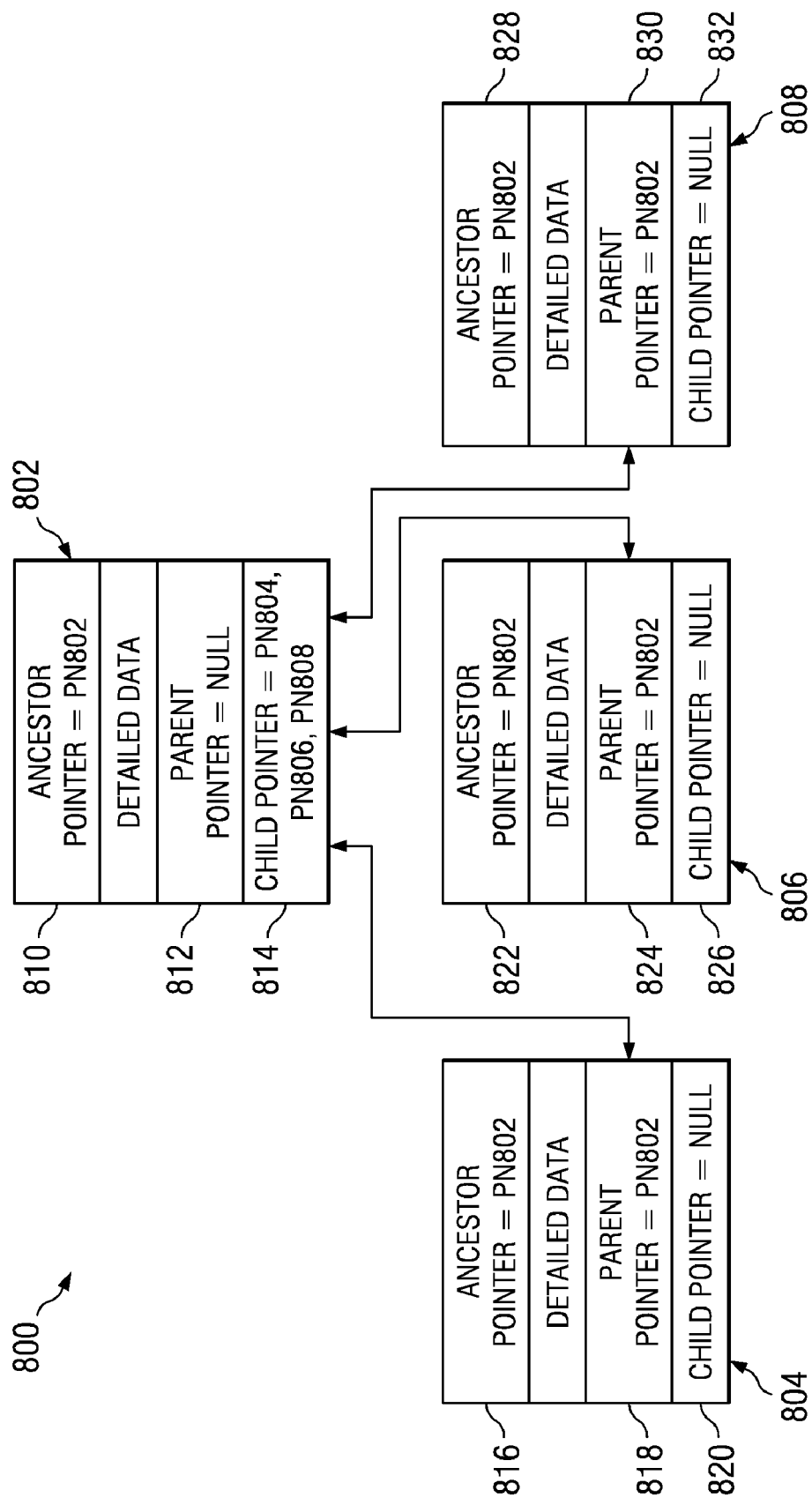

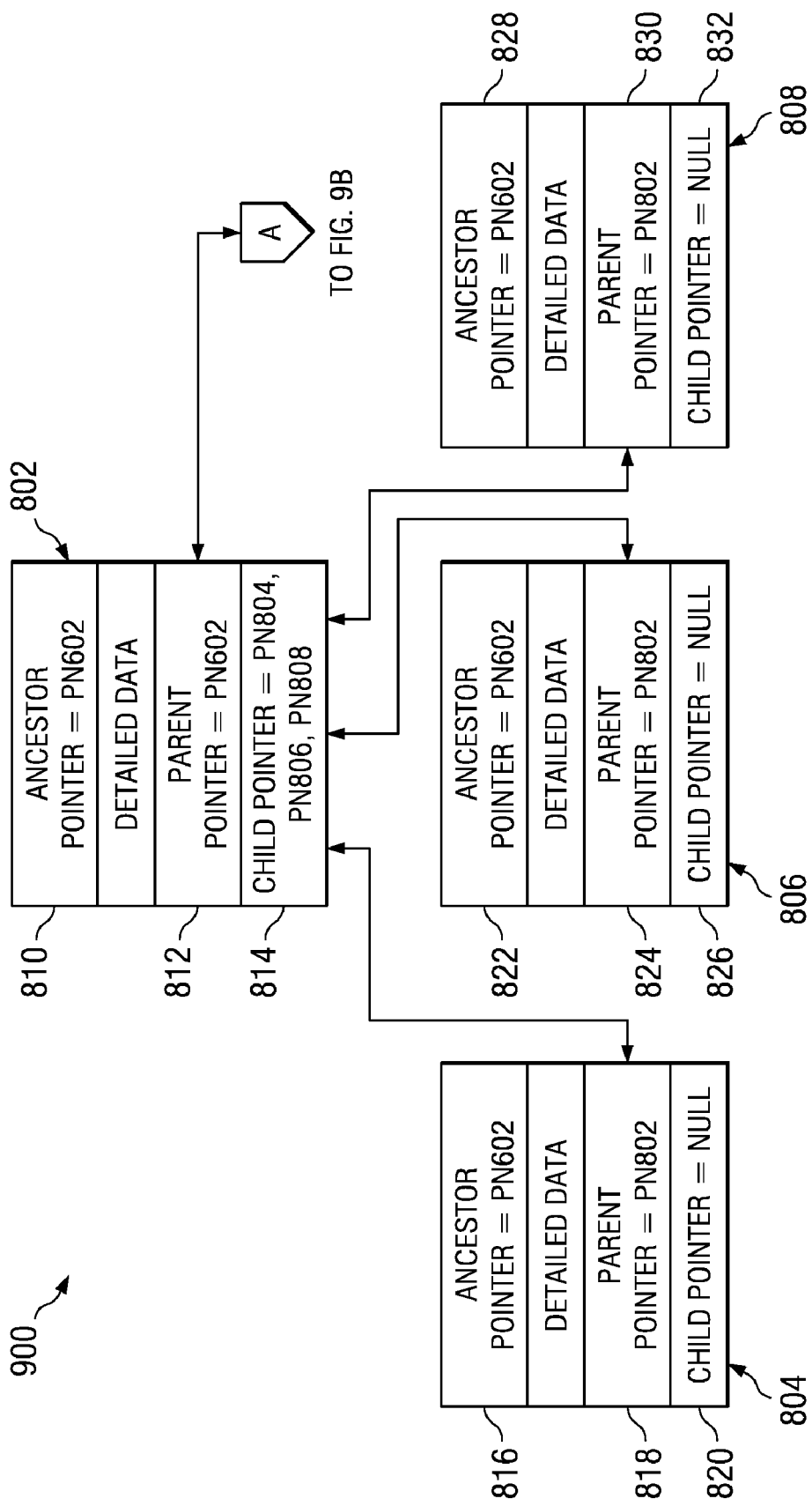

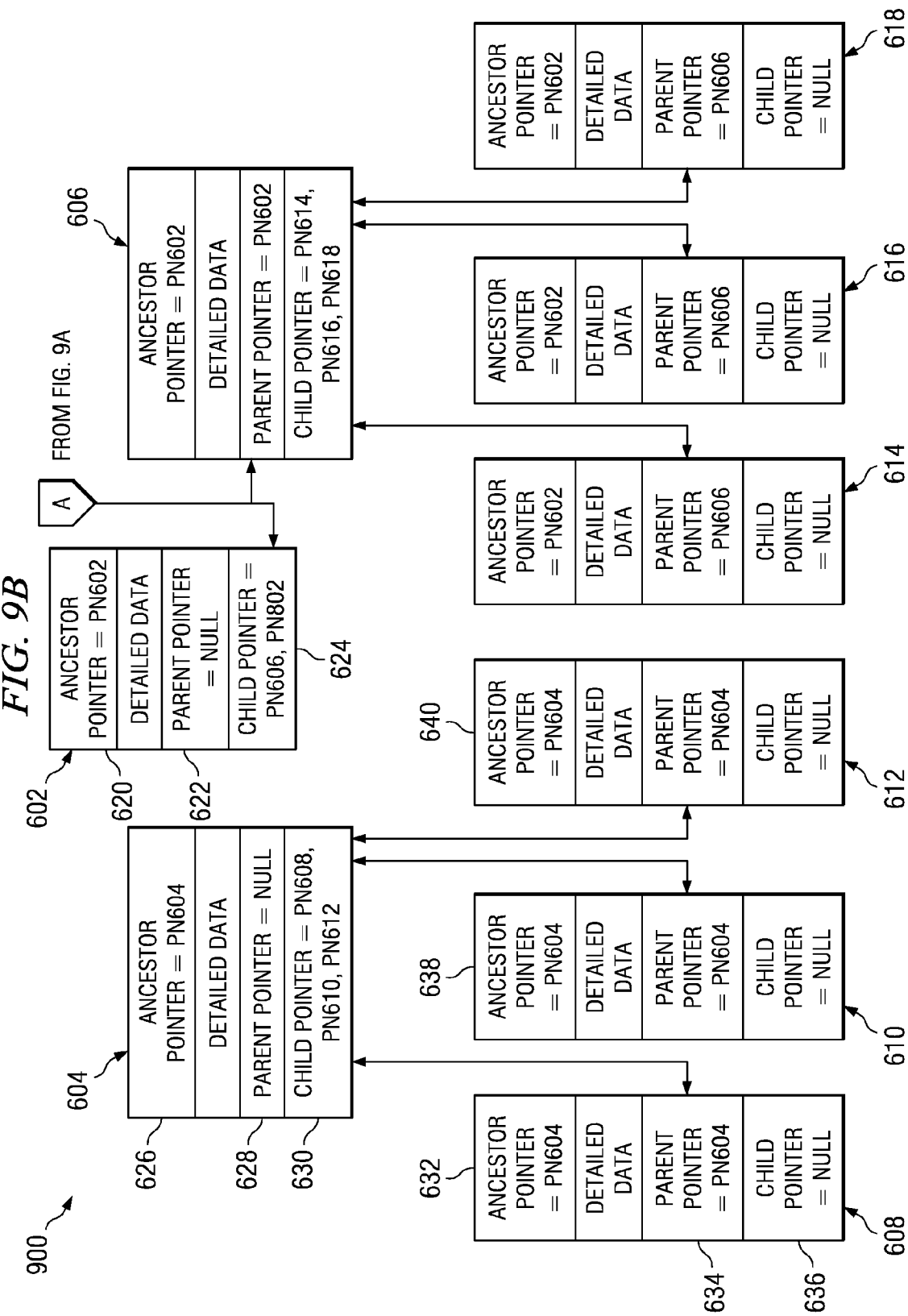

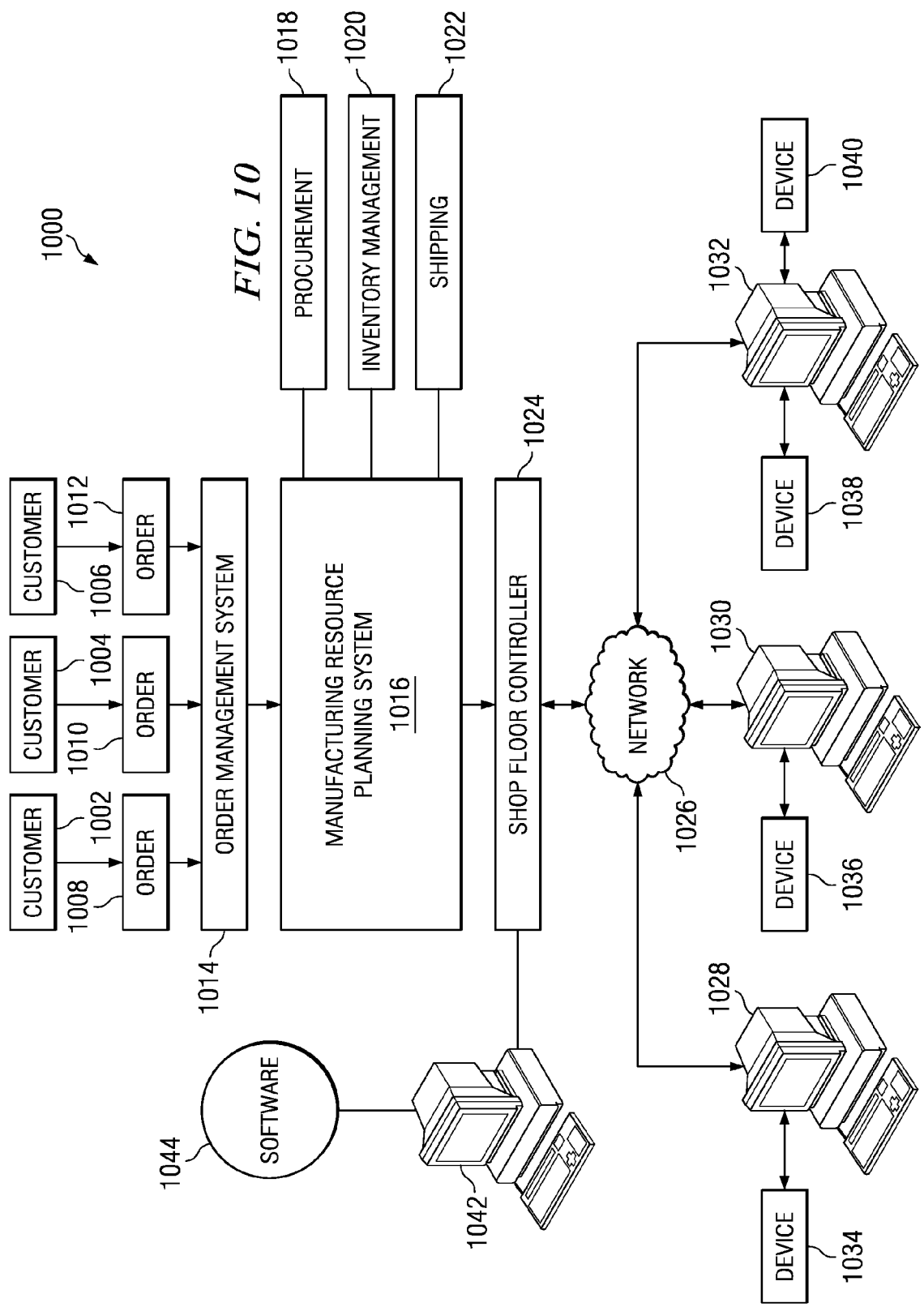

REAL-TIME IDENTIFICATION OF SUB-ASSEMBLIES CONTAINING NESTED PARTS

BACKGROUND OF THE INVENTION

1. Field of the Invention

The present invention relates generally to data processing systems and in particular to order management systems. Still more particularly, the present invention relates to a computer implemented method, apparatus, and computer program product for real-time identification of sub-assemblies containing nested parts.

2. Description of the Related Art

Modern manufacturing often involves a multi-tiered assembly process. First, a set of parts is assembled together into sub-assemblies. Second, the sub-assemblies are further assembled into more complex sub-assemblies. The process of using sub-assemblies to create larger sub-assemblies continues until a finished product is created. Thus, the finished product may be a complex structure comprised of multiple, nested sub-assemblies. For example, a hard drive may be part of a drive tray sub-assembly, the drive tray sub-assembly may be part of a drawer sub-assembly, and the drawer sub-assembly may be part of a completed server.

When parts are deeply nested in a sub-assembly or a finished product, it is important to be able to locate the highest-level sub-assembly containing a specific part. For example, when a specific part is discovered to be defective, it is useful to be able to locate all of the highest-level sub-assemblies containing the defective part in order to replace the defective part.

Currently, software applications are used to perform a post-production analysis to determine which products contain specific parts. The post-production analysis recursively analyzes sub-assemblies to determine the highest-level products containing a specific part. Because the analysis is performed post-production rather than in real-time, the analysis is performed when the parts have already been assembled into a finished product.

SUMMARY OF THE INVENTION

The different embodiments described herein provide a computer implemented method, apparatus, and computer program product for managing an ancestry tree. An order to build a product is received. The ancestry tree is created. The ancestry tree comprises a set of nodes, wherein each node represents a part of the product. A request to determine a higher level sub-assembly containing a specific part is received. The node of the specific part is located in the ancestry tree. An ancestor pointer in the node of the specific part is returned. The ancestor pointer indicates a higher level sub-assembly containing the part.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a network of data processing systems in accordance with an illustrative embodiment;

FIG. 2 is a block diagram of a data processing system in which illustrative embodiments may be implemented;

FIGS. 8A and 8B together are a block diagram of an ancestry tree in which a new part is shown before the new part is added to the ancestry tree in accordance with an illustrative embodiment;

FIGS. 9A and 9B together are a block diagram of an ancestry tree in which the new part is shown after the new part is added to the ancestry tree in accordance with an illustrative embodiment;

FIG. 10 is a block diagram of a simplified manufacturing architecture in accordance with an illustrative embodiment;

DETAILED DESCRIPTION OF THE PREFERRED EMBODIMENT

Figure 3:
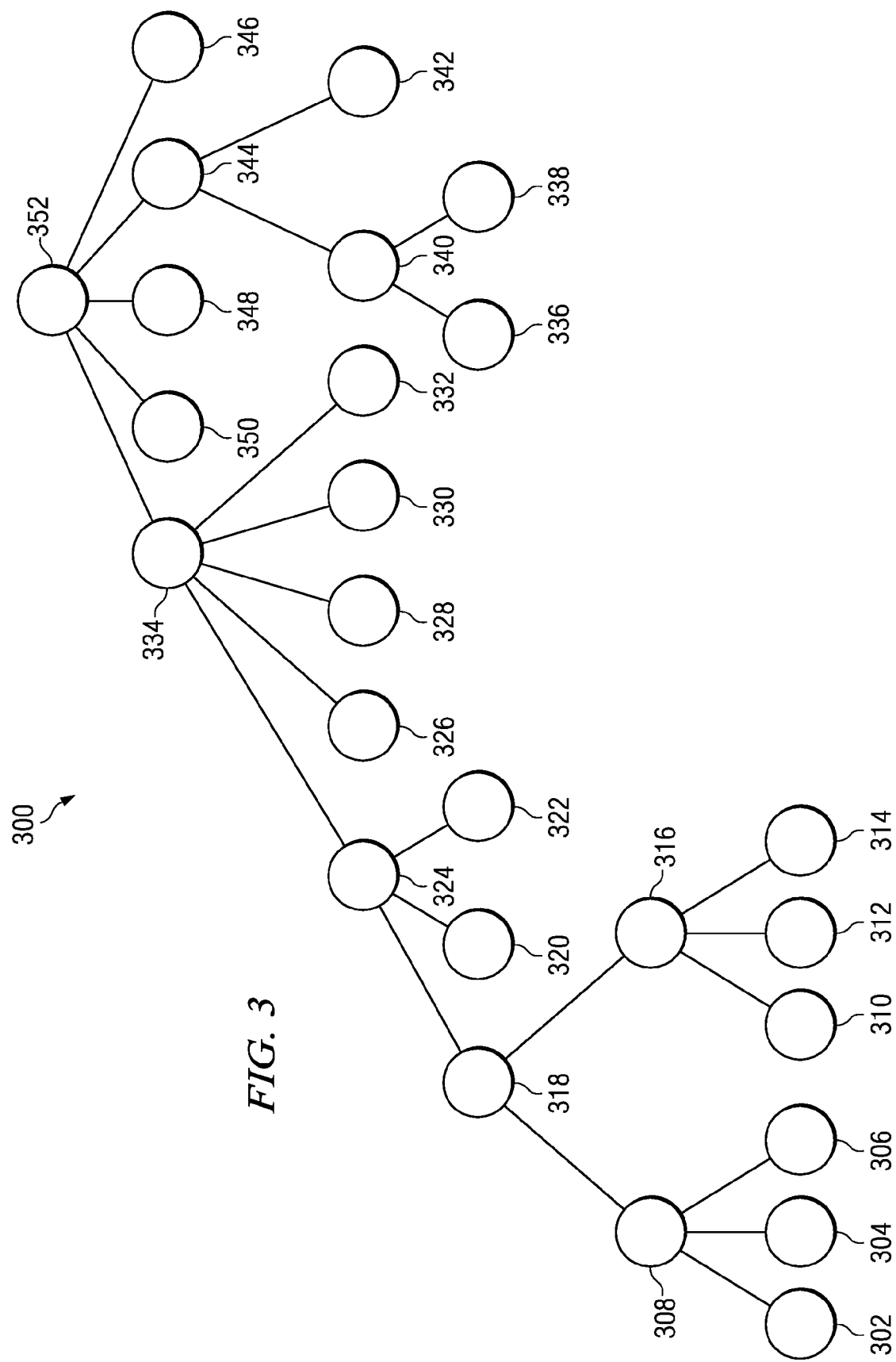
FIG. 3 is a diagram of an ancestry tree in accordance with an illustrative embodiment.

With reference now to the figures and in particular with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. In this example, clients 110, 112, and 114 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206, and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1 and 2 and above-described examples are not meant to imply architectural limitations. For example, data processing system 200 also may be a tablet computer, laptop computer, or telephone device in addition to taking the form of a PDA.

Modern manufacturing typically involves a process in which parts are initially assembled together into sub-assemblies, and the sub-assemblies are further assembled, along with additional parts, into more complex sub-assemblies. The process of assembling sub-assemblies to create more sub-assemblies continues until a finished product is produced.

The finished product is the highest-level sub-assembly a manufacturer produces. The finished product may thus contain multiple, nested sub-assemblies. In the examples given below, the term sub-assembly should be understood as including a finished product.

A finished product created by one manufacturer may be used as a part or sub-assembly by a different manufacturer. For example, one manufacturer may assemble various parts together to create a hard drive. A second manufacturer may use the hard drive as part of a drive tray sub-assembly, which in turn is part of a completed server. The completed server may be a finished product for the second manufacturer, but may be used as a part by a third manufacturer to create another finished product, such as a fault-tolerant transaction processor.

A manufacturer often uses a bill of materials (BOM) to describe a product in terms of its sub-assemblies and basic parts. The bill of materials is typically used to describe a finished product or sub-assembly which the manufacturer repeatedly builds.

When a manufacturer uses a specific sub-assembly in many different products, or in different locations in the same product, the manufacturer distinguishes each usage by assigning a unique work unit to the sub-assembly. For example, a server may have three hard drive sub-assemblies on a shelf, with one hard drive sub-assembly on the left, one in the middle, and one on the right. Each hard drive sub-assembly has the same bill of materials, but each hard drive sub-assembly is distinguished from each other by assigning each hard drive sub-assembly a different work unit.

When parts are deeply nested in a sub-assembly, it is important to be able to locate, in real time, the highest-level sub-assembly which contains a specific part. For example, when a part has been identified as defective, it is important to be able to quickly locate all of the sub-assemblies containing the defective part so that the defective part can be replaced.

In a conventional system, software applications perform a post-production analysis to construct an ancestry tree and identify which products contain which parts. In a post-production analysis, sub-assemblies are recursively analyzed to identify the highest-level products containing a specific part. Recursive means that the finished product is repeatedly analyzed and broken down into parts and sub-assemblies. For example, a finished product may be composed of parts and several sub-assemblies. Each of the sub-assemblies are then further analyzed and broken down into parts and sub-assemblies until all sub-assemblies in the finished product have been broken down into component parts.

Because the analysis is performed post-production, the analysis is usually performed after a part has been assembled into a finished product or a complex sub-assembly. Therefore, when the analysis is done post-production, typically, more effort is required to replace a defective part, because the part has already been incorporated into a higher assembly or finished product.

The embodiments recognize that if the analysis was performed in real-time, a part could be discovered in a sub-assembly earlier, before the sub-assembly was incorporated into the finished product. A defective part is typically easier to replace in a smaller sub-assembly containing the part, rather then after the part has been incorporated into several sub-assemblies and then into the finished product.

The different embodiments described herein provide a computer implemented method, apparatus, and computer program product for managing an ancestry tree. An order to build a product is received. The ancestry tree is created. The ancestry tree comprises a set of nodes, where each node represents a part of the product. A request to determine a higher level sub-assembly containing a specific part is received. The node of the specific part is located in the ancestry tree. An ancestor pointer in the node of the specific part is returned. The ancestor pointer indicates a higher level sub-assembly containing the part.

It is common for many sub-assemblies to be assembled and provided by a supplier. For a manufacturer to keep track of the ancestry tree in real-time, if a supplier provides a sub-assembly, then the supplier also provides the manufacturer with the bill of materials for the sub-assembly.

The ancestry tree is made up of a set of one or more nodes, with each node representing part. A part may refer to an individual part which cannot be further disassembled, or the part may refer to a sub-assembly. The data structure for each node usually contains a pointer to a higher level sub-assembly, and a pointer to the parent sub-assembly. A higher level subassembly may be a parent sub-assembly, a grandparent sub-assembly, or any higher level sub-assembly containing the part.

The data structure for each node may also contain a set of pointers to zero or more children of the part. If a node is a sub-assembly that is made up of other parts, the data structure for the node typically contains one or more child pointers. On the other hand, if a node is an individual part which cannot be further disassembled, the data structure for the node will have zero child pointers.

Those versed in the art will appreciate that the data structure for each node in the ancestry tree may contain additional fields and information. For example, the data structure may contain additional information, such as where the part is manufactured, the time required to manufacture the part, or other manufacturers of that part.

FIG. 3 is an ancestry tree in accordance with an illustrative embodiment. Ancestry tree 300 illustrates how a finished product is created using multiple sub-assemblies and parts. Parts 302, 304, and 306 are used to create sub-assembly 308. Parts 310, 312, and 314 are used to create sub-assembly 316. Sub-assemblies 308 and 316 are used as parts to create sub-assembly 318. Sub-assembly 318, along with parts 320 and 322, are used to create sub-assembly 324.

Sub-assembly 324, along with parts 326, 328, 330, and 332 are used to create sub-assembly 334. Parts 336 and 338 are used to create sub-assembly 340. Sub-assembly 340 is combined with part 342 to create sub-assembly 344. Sub-assemblies 334 and 344, and parts 346, 348, and 350 are used to create finished product 352.

In this example, five levels of nested sub-assemblies and parts make up finished product 352. Parts 302, 304, 306, 310, 312, and 314 comprise the first level. Sub-assemblies 308 and 316 comprise the second level. Sub-assembly 318 and parts 320, 322, 336 and 338 comprise the third level. Sub-assemblies 324 and 340, and parts 326, 328, 330, 332, and 342 comprise the fourth level. Sub-assemblies 334 and 344, and parts 346, 348, and 350 comprise the fifth level.

This example illustrates how a product, such as finished product 352, may contain multiple sub-assemblies, in which each sub-assembly may contain additional sub-assemblies. If a part at a lower-level is identified as defective, then it is important to identify all higher level sub-assemblies containing the defective part, so that the defective part can be replaced. FIG. 3 is an example of an ancestry tree which can be constructed and used to identify all the higher level sub-assemblies containing a specific part.

By maintaining an ancestry tree for a complex finished product in which the root node is the finished product, the relationship between each sub-assembly or part and the root node may be maintained in real-time. The product tree is initialized when assembly plans are first sent to manufacturing. As the product is manufactured, each time a sub-assembly is added, a sub-tree corresponding to the sub-assembly is added to the ancestry tree of the product.

If a defective part is found, the sub-assemblies containing the defective part are identified. Each sub-tree corresponding to the sub-assembly containing the defective part is removed from the tree. A sub-tree corresponding to the replacement sub-assembly is inserted into the tree in place of the sub-assembly containing the defective part. The process of adding and removing parts and sub-trees from the ancestry tree is described in more detail in the following examples.

Figure 4:
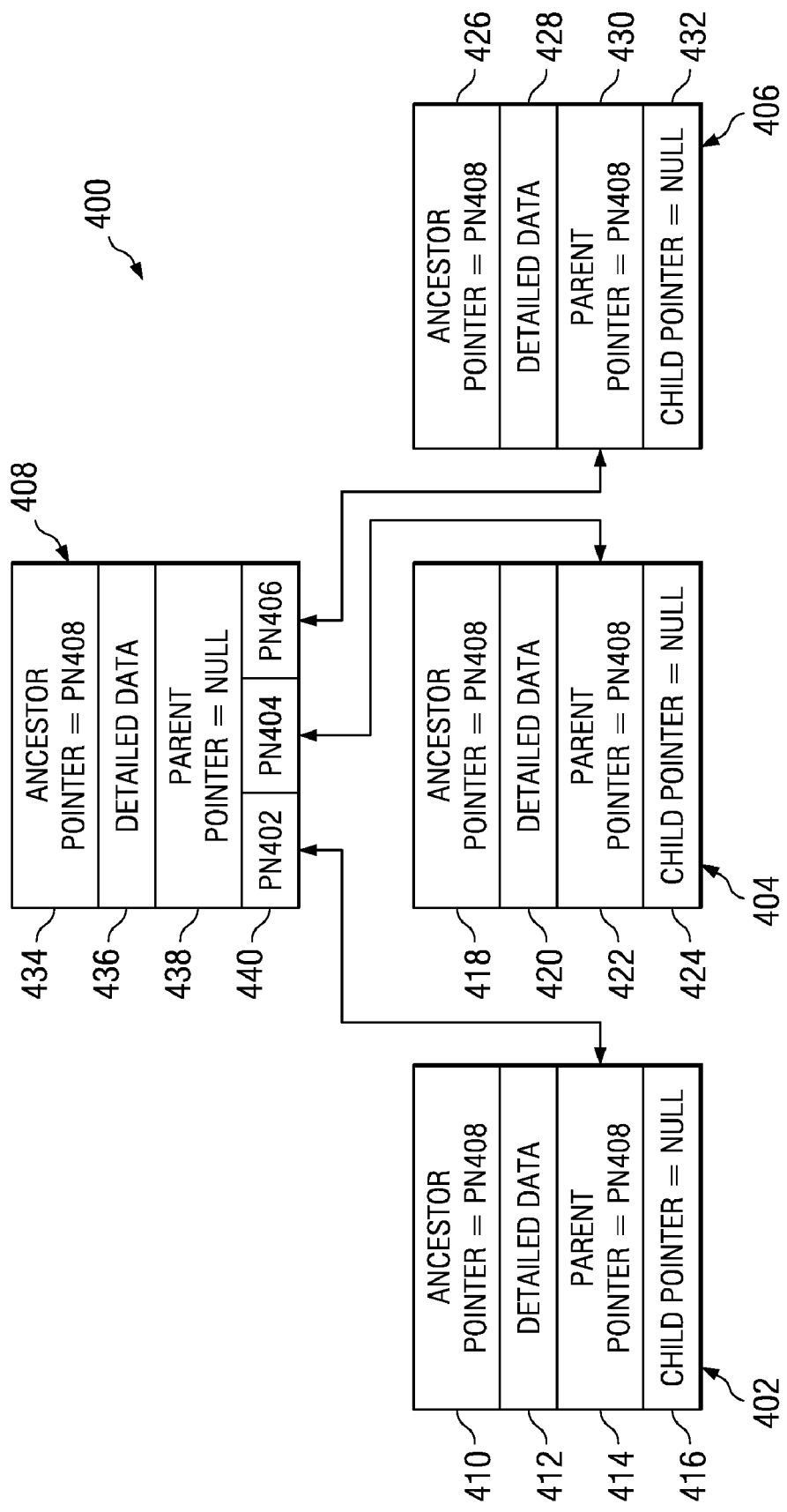
FIG. 4 is a block diagram of an ancestry tree having parent and child pointers in accordance with an illustrative embodiment.

FIG. 4 is an ancestry tree having parent and child pointers in accordance with an illustrative embodiment. Ancestry tree having parent and child pointers 400 illustrates how a sub-assembly, such as sub-assembly 308 in FIG. 3, is created using parts 402, 404, and 406.

In this example, parts 402, 404, and 406 are used to create sub-assembly 408. The ancestry tree data structure used in this example has four fields: a pointer to the highest-level ancestor, a detailed data field, a pointer to a parent, and pointer(s) to any children. A pointer is data whose value refers directly to ("points to") another value stored elsewhere. In this example, parts 402, 404, and 406 are the children, and the parent is sub-assembly 408.

In the data structure for part 402, field 410 contains a pointer to the highest ancestor, field 412 contains detailed data about the part, field 414 contains the parent pointer, and field 416 contains the child pointer(s). Part 402 is not a subassembly and may not be broken down into any more parts. Therefore, field 416 has a null pointer, indicating there are no children of part 402. Part 402 is part of sub-assembly 408; therefore, field 414 contains a pointer to the parent sub-assembly, part 408. Part 408 is also the highest-level ancestor for part 402; therefore, field 410 points to part 408.

In the data structure for part 404, field 418 contains a pointer to the highest ancestor, field 420 contains detailed data about the part, field 422 contains the parent pointer, and field 424 contains the child pointer(s). The detailed data in field 420 provides information about the part such as the part number, locations where the part is manufactured, and a list of equivalent parts which may be substituted for part 404. Those versed in the art will appreciate that various types of information may be provided in field 420, in addition to, or instead of the examples given herein.

Part 404 is not a sub-assembly; therefore, field 424 has a null pointer, indicating there are no children of part 404. Part 404 is part of sub-assembly 408. Therefore, field 422 contains a pointer to the parent sub-assembly, part 408. Part 408 is also the highest-level ancestor for part 404; therefore, field 418 points to part 408.

In the data structure for part 406, field 426 contains a pointer to the highest ancestor, field 428 contains detailed data about the part, field 430 contains the parent pointer, and field 432 contains the child pointer(s). Part 406 is not a sub-assembly; therefore, field 432 has a null pointer, indicating there are no children of part 406. Part 406 is part of sub-assembly 408. Therefore, field 430 contains a pointer to the parent sub-assembly, part 408. Part 408 is also the highest-level ancestor for part 406; therefore, field 426 points to part 408.

In the data structure for part 408, field 434 contains a pointer to the highest ancestor, field 436 contains detailed data about the part, field 438 contains the parent pointer, and field 440 contains the child pointer(s). Part 408 is a sub-assembly, and therefore, field 440 has three pointers to the children, parts 402, 404, and 406. Part 408 at this point in the assembly process is not part of a sub-assembly. Therefore, field 438 contains a null pointer indicating that part 408 has no parent sub-assembly. Part 408 is also the highest-level ancestor for part 408; therefore, field 434 points to part 408.

Figure 5:
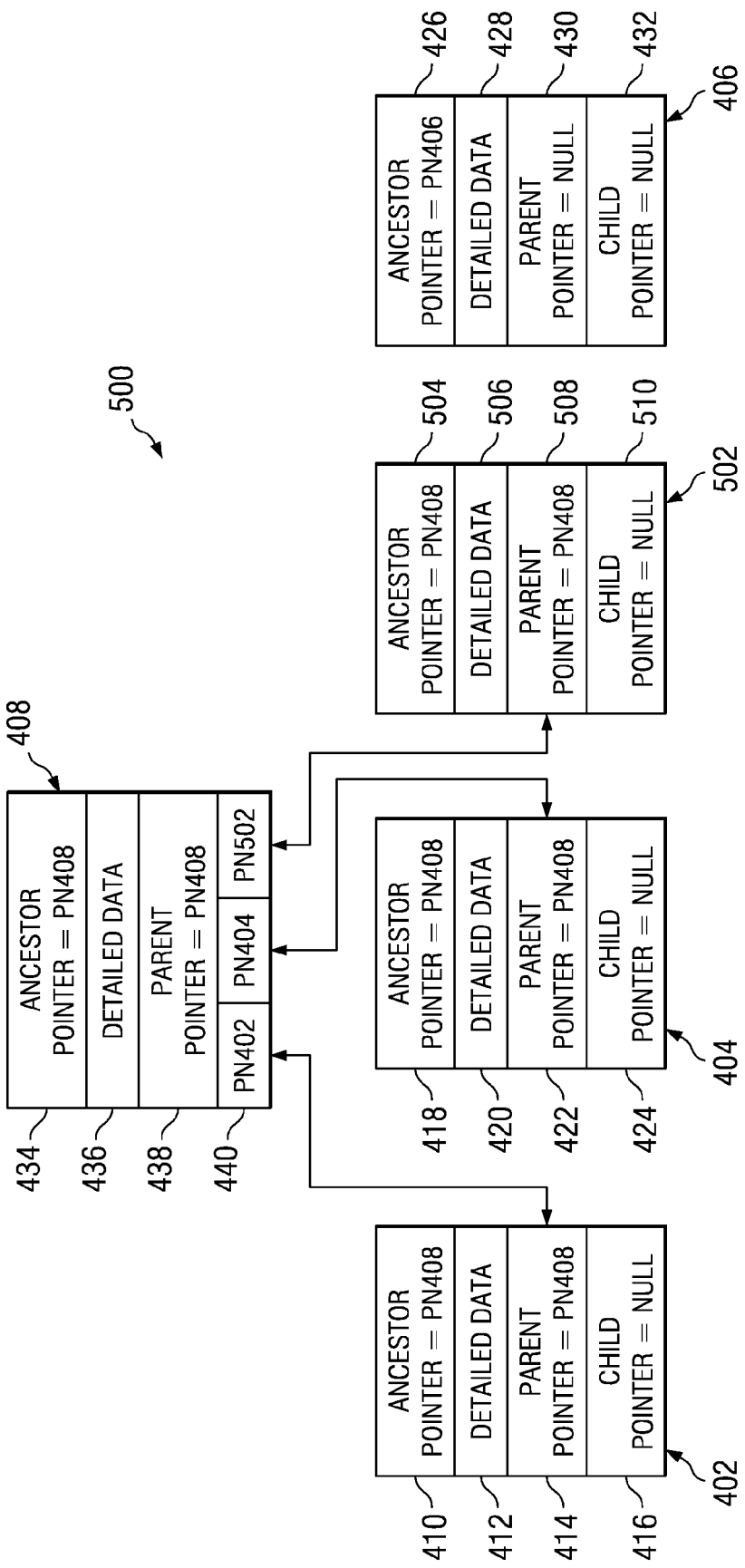
FIG. 5 is a block diagram of an ancestry tree containing a defective part in accordance with an illustrative embodiment.

FIG. 5 is an ancestry tree containing a defective part in accordance with an illustrative embodiment. Ancestry tree containing a defective part 500 illustrates what happens to a sub-assembly, such as sub-assembly 308 in FIG. 3, when a part is determined to be defective.

In this example, part 406 in FIG. 4 is assumed to be defective and is replaced with part 502. This example illustrates how the ancestor pointer, parent pointer, and child pointer are dynamically updated when a defective part is found. In FIG. 5, parts 402 and 404 have not changed from FIG. 4.

However, once part 406 is determined to be defective, part 406 becomes an orphan and the pointer fields are updated accordingly. Field 426 is updated so that the pointer to the highest-level ancestor points to part 406 rather than part 408. Because part 406 no longer has a parent, the parent pointer in field 430 is set to null.

Part 502 is substituted for defective part 406, and the appropriate pointer fields are updated. In sub-assembly 408, the child pointer in field 440 that pointed to part 406 is replaced with a pointer to part 502. In part 502, field 504 is updated so that the pointer to the highest-level ancestor points to part 408. Field 506 contains detailed data about part 502. The parent pointer in field 508 is updated to point to part 408. The child pointer in field 510 remains null because part 502 has no child parts.

FIGS. 6, 7, 8 and 9 together illustrate how a part is replaced in an ancestry tree when the part is a sub-assembly. An ancestry tree is described, a part is determined to be defective, a new part is introduced, and the new part is then used to replace the defective part in the ancestry tree.

Figure 6:
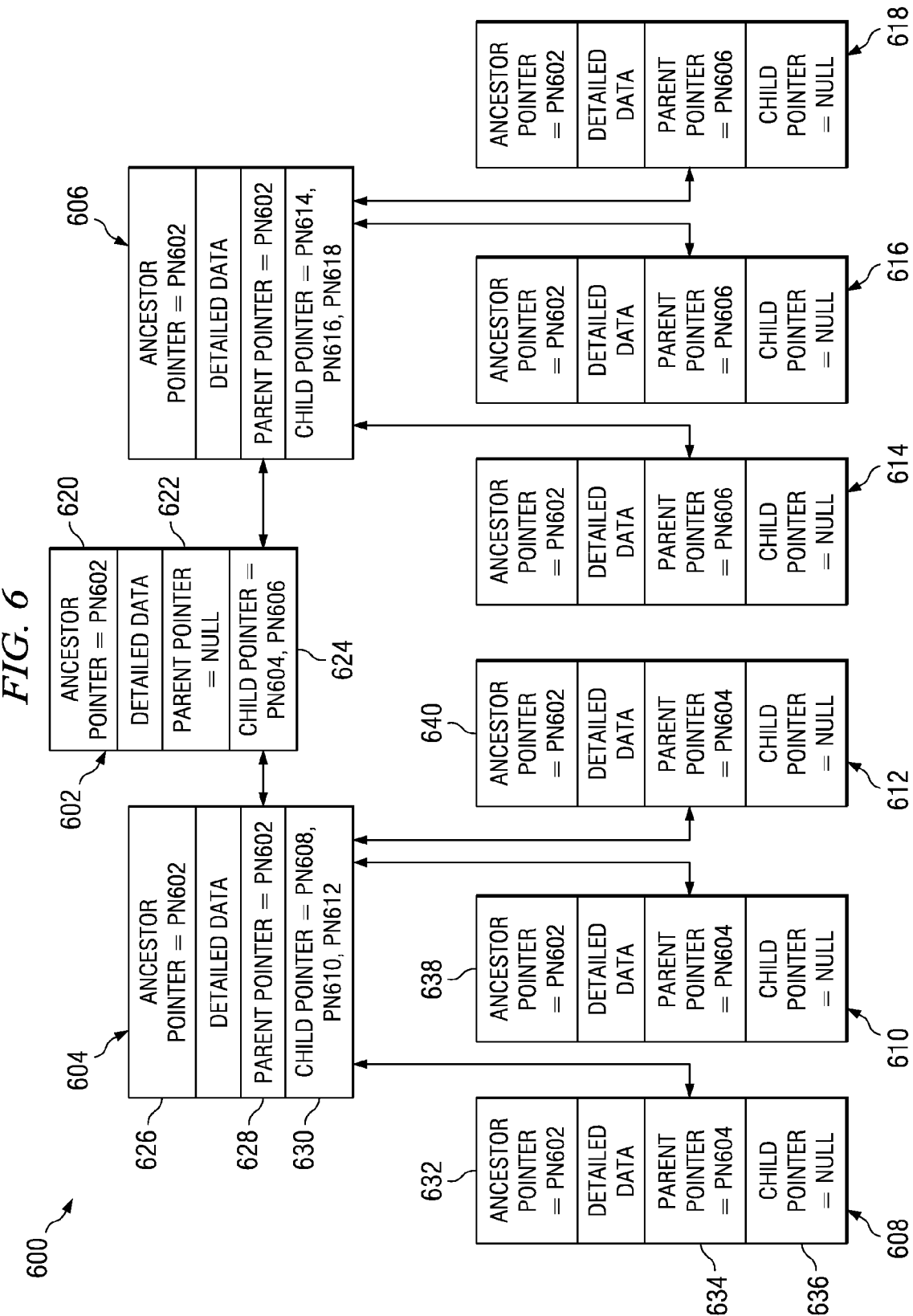
FIG. 6 is a block diagram of an ancestry tree containing three levels of parts in accordance with an illustrative embodiment.

FIG. 6 is an ancestry tree containing three levels of parts in accordance with an illustrative embodiment. Ancestry tree containing three levels of parts 600 shows how a sub-assembly, such as sub-assembly 318 in FIG. 3, is made from other sub-assemblies. For simplicity, only relevant fields of the data structure for each part are discussed, but it should be understood that each data structure may have additional fields, such as those previously mentioned.

In this example, part 602 is a sub-assembly made by combining part 604 and part 606. Parts 604 and 606 are each sub-assemblies as well. Part 604 is made up of parts 608, 610, and 612. Part 606 is made up of parts 614, 616, and 618.

In the data structure for part 602, the highest-level ancestor pointer, field 620, is set to part 602. Because part 602 is not currently used as part of any other sub-assembly, field 622 has the parent pointer set to null. Because part 602 has two children, field 624 has the child pointers set to part 604 and part 606.

In the data structure for part 604, the highest-level ancestor pointer, field 626, is set to part 602. Because part 604 is part of sub-assembly 602, field 628 has the parent pointer set to part number 602. Because part 604 has three children, field 630 has pointers to the children, parts 608, 610, and 612.

In the data structure for part 608, the highest-level ancestor pointer, field 632, is set to part 602. Because part 608 is part of sub-assembly 604, field 634 has the parent pointer set to part number 604. Because part 608 has no children, field 636 is null.

The fields in the data structures for parts 610 and 612 are similar to the fields for part 608. For example, the pointers to the highest-level ancestor in fields 638 and 640 are set to part 602. The fields for parts 606, 614, 616, and 618 are similar to the parts fields for parts 604, 608, 610, and 612, respectively. Because sub-assembly 602 is the highest-level ancestor for all the parts in FIG. 6, the ancestor pointer for parts 602-618 is set to part 602. Parts 608-618 are not made up of other parts and so the child pointers for parts 608-618 are null.

If a defective part is found, the sub-assemblies containing the defective part are removed from the tree, and a sub-tree corresponding to the replacement sub-assembly is inserted into the tree in place of the sub-assembly containing the defective part. For example, if sub-assembly 604 is defective, sub-assembly 604 may be replaced with another sub-assembly.

Figure 7:
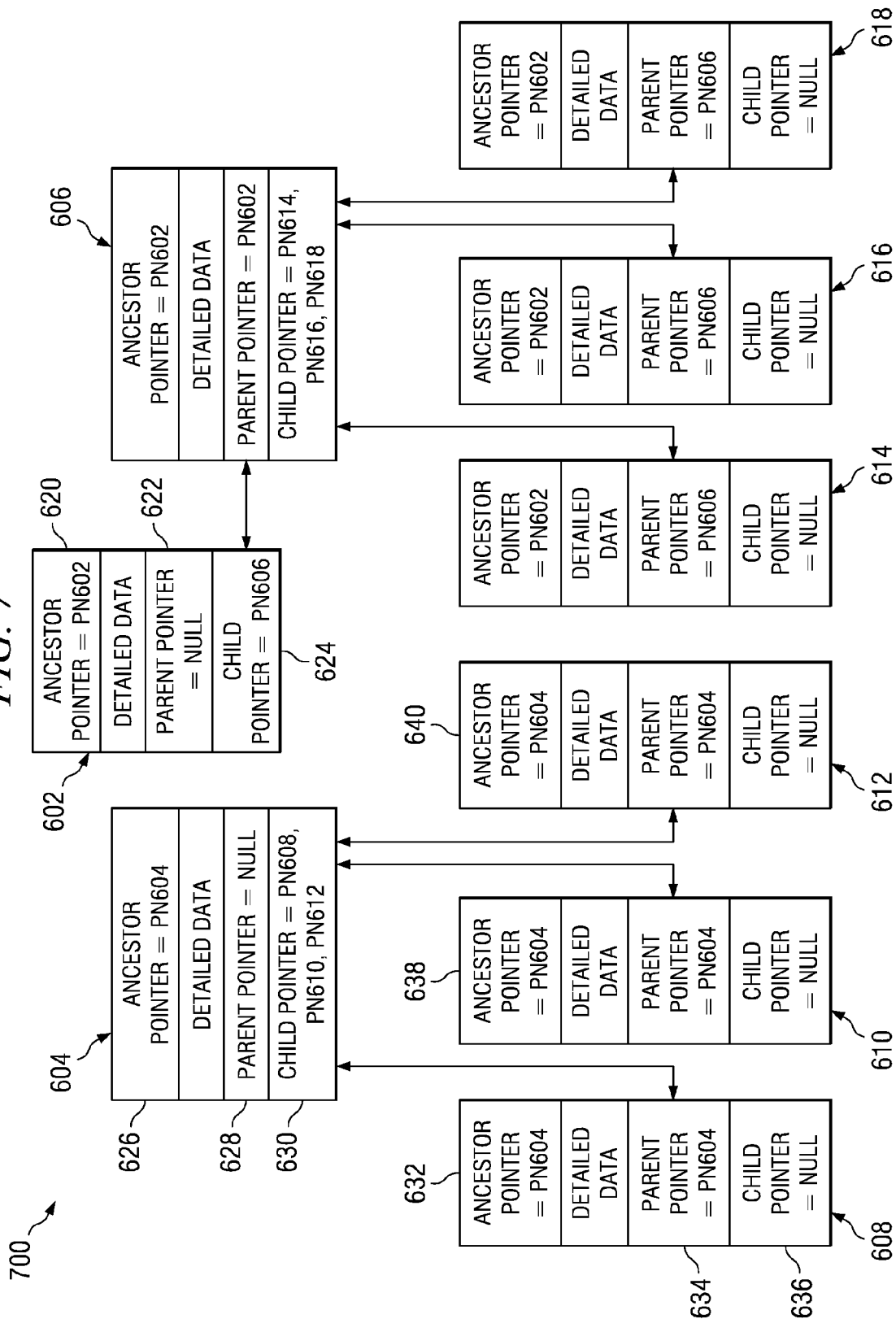
FIG. 7 is a block diagram of an ancestry tree in which a part is found defective and is orphaned in accordance with an illustrative embodiment.

FIG. 7 is an ancestry tree in which a part is found defective and is orphaned in accordance with an illustrative embodiment. FIG. 7 is an example of how, when a part is determined to be defective, a sub-assembly is removed from the ancestry tree.

In ancestry tree in which a part is found defective and is orphaned 700, a determination is made that sub-assembly 604 is defective. The first step in replacing the defective sub-assembly is to remove sub-assembly 604. When assembly 604 is removed from sub-assembly 602, the following changes are made to the various pointers.

In sub-assembly 602, the pointer to part 604 is removed from field 624 to indicate that part 604 is no longer a child of sub-assembly 602. In sub-assembly 604, the parent pointer in field 628 is changed to null to indicate that sub-assembly 604 is no longer part of sub-assembly 602. In sub-assembly 604, the highest-level ancestor is changed from part 602 to part 604 to indicate that part 604 is no longer used in sub-assembly 602 and therefore, the highest-level ancestor is part 604. The highest-level ancestor pointer is also changed in fields 632, 638, and 640 to indicate that the highest-level ancestor for parts 608, 610, and 612, respectively, is sub-assembly 604.

Figure 8B:
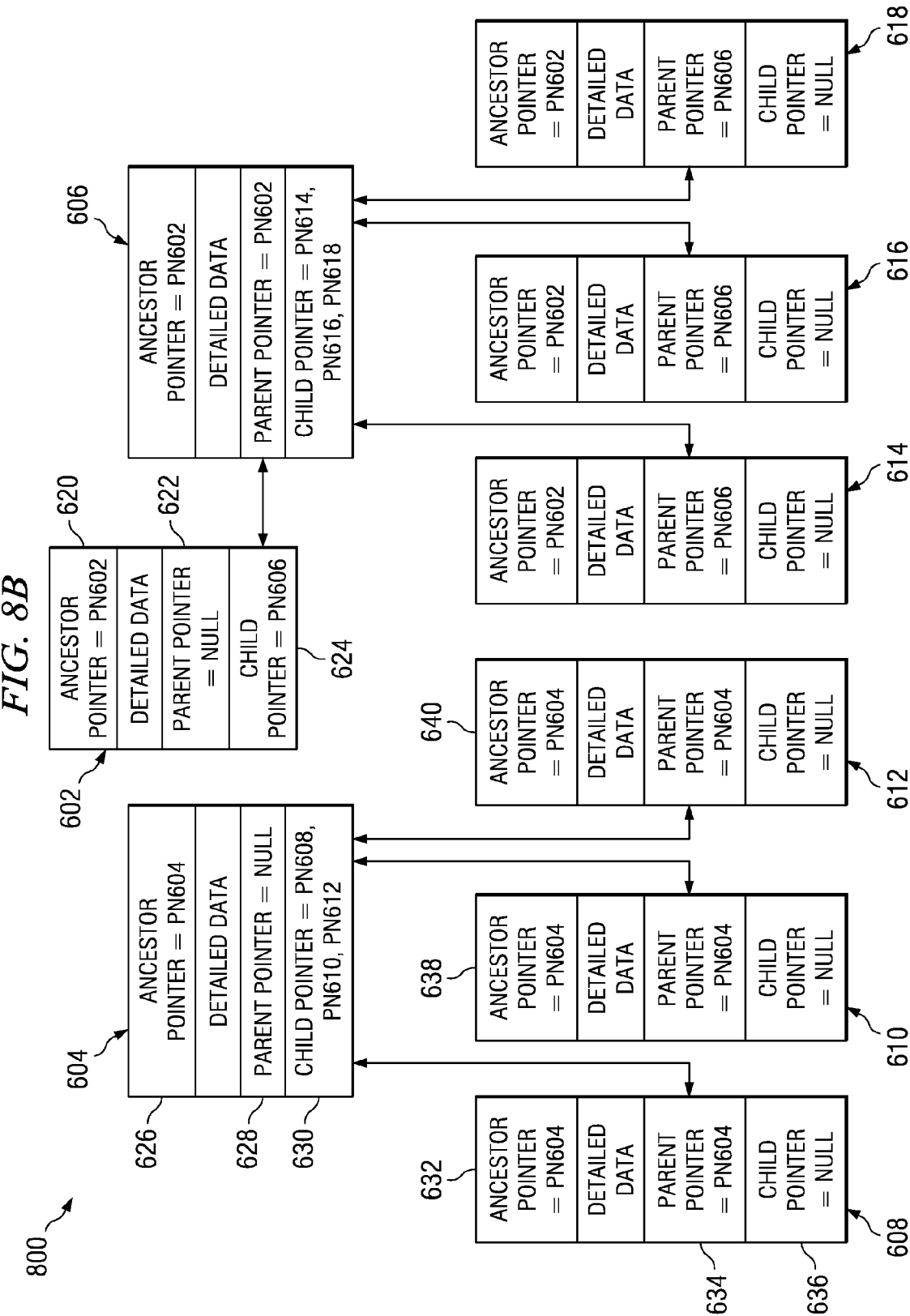

FIGS. 8A and 8B together are an ancestry tree in which a new part is shown before it is added to the ancestry tree in accordance with an illustrative embodiment. Ancestry tree 800 shows the pointers in the new part and in the ancestry tree before the new part is added to the ancestry tree. The new part is added to replace a defective part.

In this example, the new part is a sub-assembly and the defective part is a sub-assembly. Those versed in the art will appreciate that the technique described herein may be used when the new part is an individual part or a sub-assembly.

In FIG. 8A, sub-assembly 802 is the data structure representing the new part which will replace sub-assembly 604 in sub-assembly 602. Sub-assembly 802 is made of parts 804, 806, and 808. FIG. 8A shows the values of the pointers in sub-assembly 802. In sub-assembly 802, the highest-level ancestor pointer in field 810 is initially set to sub-assembly 802. Before being added to the ancestry tree for sub-assembly 602, the parent pointer in field 812 is set to null. The child pointers in field 814 point to parts 804, 806, and 808.

In parts 804, 806, and 808, the highest-level ancestor pointer in fields 816, 822, and 828 is set to sub-assembly 802. The parent pointer in fields 818, 824, and 830 is also set to sub-assembly 802. The child pointer in fields 820, 826, and 832 is set to null in parts 804, 806, and 808, respectively. FIG. 8B shows sub-assembly 604 is orphaned and is no longer a child of sub-assembly 602.

FIGS. 9A and 9B together are an ancestry tree in which a new part is shown after it is added to the ancestry tree in accordance with an illustrative embodiment. Ancestry tree 900 shows the pointers in the new part and in the ancestry tree after the new part is added to the ancestry tree to replace a defective part.

In this example, part 802 replaces part 604 in the ancestry tree for sub-assembly 602, and the pointer fields in parts 602, 802, 804, 806, and 808 are updated as follows. In FIG. 9A, the parent pointer in field 812 is changed from null to part 602, because part 802 is now part of sub-assembly 602. Ancestor fields 810, 816, 822, and 828 are updated to indicate that part 602 is now the highest-level ancestor.

In FIG. 9B, the child pointer in field 624 is modified by adding a pointer to part 802, because part 802 is now part of sub-assembly 602. Sub-assembly 604, which was determined to be defective, remains orphaned from sub-assembly 602.

Thus, the ancestry tree is constructed with each node of the tree representing a part. A part may be an individual component or a sub-assembly. Each node is a data structure containing information about the node and the relationship of the node to other nodes.

Each node may contain different types of pointers, such as an ancestry pointer, a parent pointer, and pointers to child nodes. The ancestry pointer in a node points to the highest-level sub-assembly which the node is a part of. If a node is part of a sub-assembly, then the node contains a parent pointer to the parent sub-assembly. If a node is a sub-assembly, then the node contains a pointer for each child node which makes up the sub-assembly. Additional information about the node may also be contained in the data structure of the node.

Various operations may be performed to the nodes in the ancestry tree. A new node may be created, or an existing node may be destroyed. A node, along with the children of the node, may be added to the ancestry tree as a child of another node. A node which is a child of another node may be orphaned so that the node is no longer the child of any node.

When an operation is performed to a node in the ancestry tree, at least one of the ancestry pointer, the parent pointer, or the child pointer(s) is modified. In particular, each node always knows the highest-level part which the node belongs to so that the highest-level ancestor of each part can be quickly identified. Each node has a single ancestor node at any given point in time.

FIG. 10 depicts a simplified manufacturing architecture in accordance with an illustrative embodiment. Simplified manufacturing architecture 1000 illustrates the basic components in a manufacturing environment and shows where the software which creates and maintains the ancestry tree may be placed in the manufacturing environment.

In this example, customers 1002, 1004, and 1006 place orders 1008, 1010, and 1012b, respectively. Orders 1008, 1010, and 1012 are received by order management system (OMS) 1014. Order management system 1014 sends the orders into manufacturing resource planning (MRP), or enterprise resource planning (ERP) system 1016. Manufacturing resource planning system 1016 is connected to other systems, including procurement 1018, inventory management 1020, shipping 1022, and shop floor controller 1024.

Shop floor controller 1024 is typically software and hardware which is used to manage the various devices which manufacture products. Shop floor controller 1024 may be connected by a network, such as network 1026. Network 1026 may be a wired network, a wireless network, or a network which uses both wired and wireless technologies to provide communications between the various network components connected to network 1026. For example, network 1026 may use wired technologies such as twisted copper pair, Ethernet, General Purpose Instrument Bus (GPIB), and optical fiber, as well as wireless technologies such as IEEE 802.11, and Bluetooth.

Various workstations are connected to network 1026 to control the manufacturing devices. In this example, workstations 1028, 1030, and 1032 are connected to network 1026. Workstation 1028 controls device 1034, workstation 1030 controls device 1036, and workstation 1032 controls devices 1038 and 1040.

Those versed in the art will appreciate that the number of workstations and devices shown in FIG. 10 are for illustration purposes only. In a manufacturing environment, multiple workstations may be attached to network 1026, and each workstation may control multiple devices.

Workstation 1042 is attached to shop floor controller 1026. Software 1044 runs on workstation 1042. Software 1044 creates and maintains the ancestry tree for goods manufactured using shop floor controller 1024. In this example, workstation 1042 is shown attached to shop floor controller 1024. However, in another embodiment, workstation 1042 may be connected to the manufacturing devices using network 1026.

Figure 11:
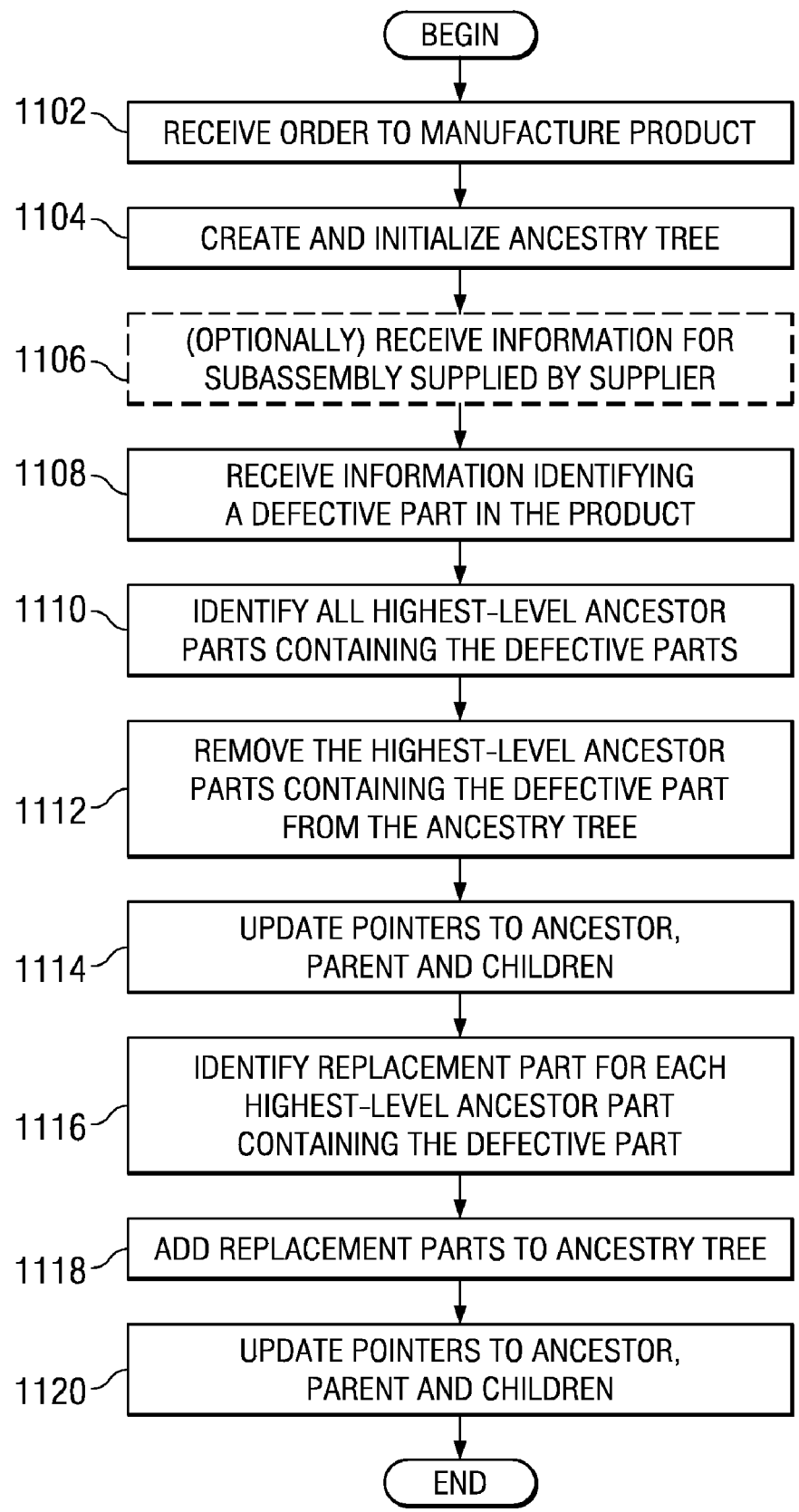
FIG. 11 is a flowchart of a process for creating and maintaining an ancestry tree in accordance with an illustrative embodiment.

FIG. 11 is a flowchart of a process for creating and maintaining an ancestry tree in accordance with an illustrative embodiment. The process described in FIG. 11 is executed by a software process, such as software 1044 in FIG. 10.

The process begins when an order is received to manufacture a product (step 1102). The order may, for example, be configure to order (CTO) or build to plan (BTP). The ancestry tree is created and initialized (step 1104). Optionally, if a sub-assembly used to create the product is supplied by a supplier, then the process receives information about the sub-assembly from the supplier (step 1106). The supplier provides sufficient information about the sub-assembly for constructing an ancestry tree for the sub-assembly, such as information about the individual components, and the parent and child relationships between the individual components.

The process receives information that a part used to make the product has been determined to be defective (step 1108). The process uses the ancestor pointer contained in the data structure for each node of the ancestry tree to identify all the highest-level ancestor parts which contain the defective part (1110). The process removes the highest-level ancestor parts which contain the defective part from the ancestry tree (step 1112). The pointers to the highest-level ancestor, parent, and children are updated in the ancestry tree, and for the highest-level ancestor parts which contain the defective part (step 1114).

A replacement part is identified for each highest-level ancestor part which contains the defective part (step 1116). The replacement part or parts are added to the ancestry tree (step 1118). The pointers to the highest-level ancestor, parent, and children are updated in the ancestry tree (step 1120), and the process ends.

Figure 12:
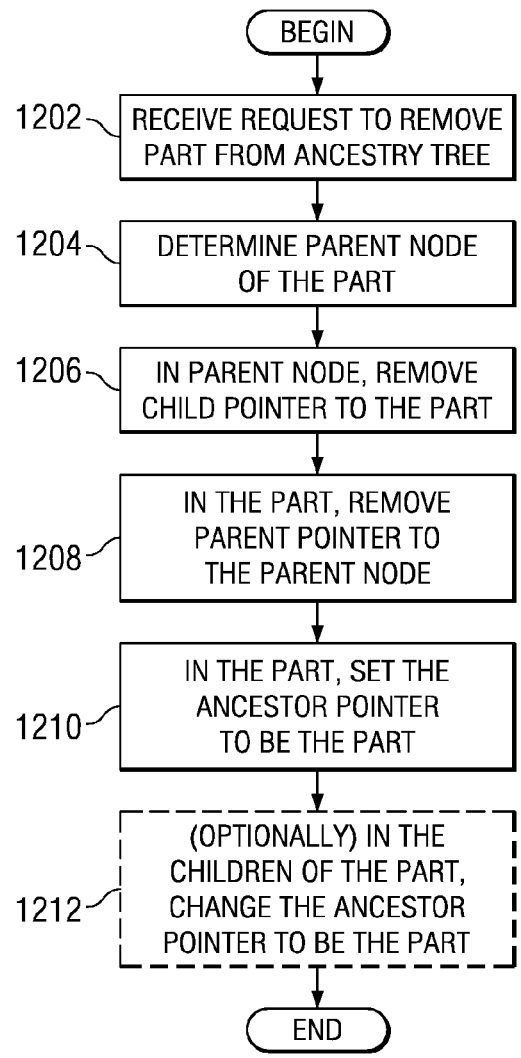
FIG. 12 is a flowchart of a process for removing a part from an ancestry tree in accordance with an illustrative embodiment.

FIG. 12 is a flowchart of a process for removing a part from an ancestry tree in accordance with an illustrative embodiment. The process described in FIG. 12 is executed by a software process, such as software 1044 in FIG. 10.

The process begins when a request is received to remove a part from the ancestry tree (step 1202). The parent node of the part is identified from the parent pointer in the part (step 1204). In the parent node, the child pointer to the part is removed (step 1206). In the part, the parent pointer to the parent node is removed (step 1208). In the part, the ancestor pointer is set to the part (step 1210).

If the part has child pointers, then in each child, the ancestor pointer is changed to a pointer to the part (step 1212), and the process ends. Step 1212 is optional and is performed only if the part has child pointers.

Figure 13:
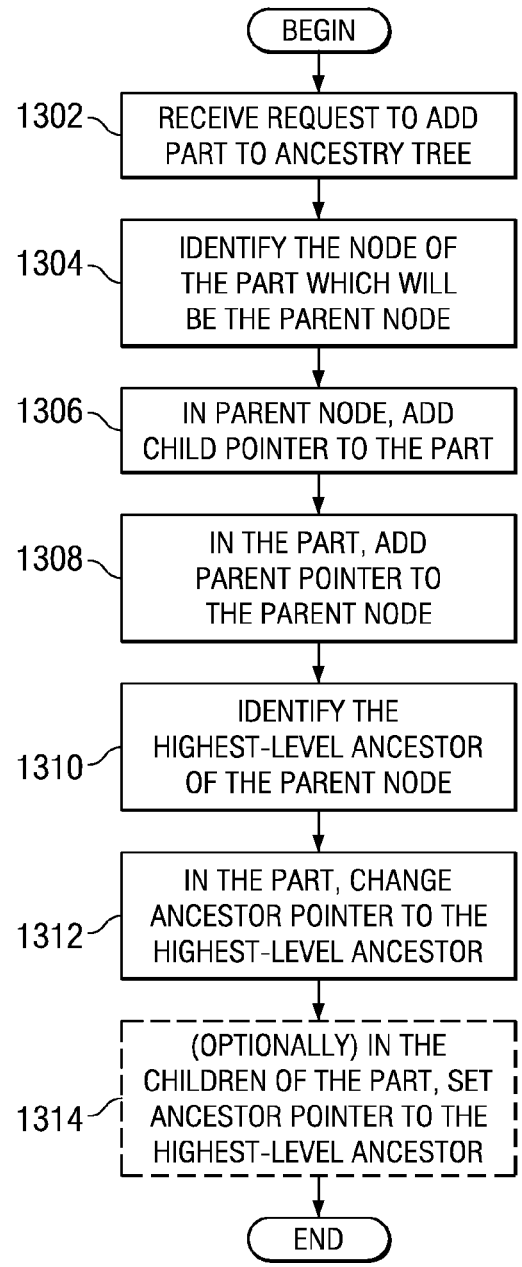
FIG. 13 is a flowchart of a process for adding a part to an ancestry tree in accordance with an illustrative embodiment.

FIG. 13 is a flowchart of a process for adding a part to an ancestry tree in accordance with an illustrative embodiment. The process described in FIG. 13 is executed by a software process, such as software 1044 in FIG. 10.

The process begins when a request to add a part to an ancestry tree is received (step 1302). The node which will be the parent node of the part is identified (step 1304), typically from information in the request. In the parent node, a child pointer to the part is added (step 1306). In the part, a parent pointer to the parent node is added (step 1308).

The highest-level ancestor of the parent node is identified using the ancestor pointer in the parent node (step 1310). In the part, the ancestor pointer is changed to the highest-level ancestor which was previously identified (step 1312).

If the part has child pointers, then the ancestor pointer in each child is set to the highest-level ancestor pointer (step 1314), and the process ends. Step 1314 is optional and is performed only if the part has child pointers.

The different embodiments provide a computer implemented method, apparatus, and computer program product for managing an ancestry tree. An order to build a product is received. The ancestry tree is created. The ancestry tree comprises a set of nodes, where each node represents a part of the product. A request to determine the highest-level sub-assembly containing a specific part is received. The node of the specific part is located in the ancestry tree. An ancestor pointer in the node of the specific part is returned. The ancestor pointer indicates a higher level sub-assembly containing the part.

The flowchart and block diagrams in the figures illustrate the architecture, functionality, and operation of some possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing an ancestry tree of an order management system, the computer implemented method comprising:

responsive to receiving an order to build a product, creating, by a processor, the ancestry tree for the order management system, wherein the ancestry tree comprises a plurality of nodes, wherein each node in the plurality of nodes represents at least one of a subassembly and a part, and each node contains a data field, a parent pointer to a parent node, one or more child pointers to one or more child nodes and an ancestor pointer to a highest level sub-assembly that contains a particular part, wherein a child pointer may point to a lower level sub-assembly node or to a part node, and wherein the highest level sub-assembly node is a last node in one or more chains of nodes beginning with the part node and ending in the highest level sub-assembly node, and wherein each node in the one or more chains of nodes contains the ancestor pointer to the highest level sub-assembly node;

responsive to a request to change a specific part to a different part, identifying, by the processor, all nodes from each specific part node to each highest level sub-assembly node in the ancestry tree that contains an ancestor pointer to the specific part;

replacing, by the processor, a specific part data in each specific part node data field with a new part data to form a new part node with a new part data field;

updating, by the processor, all ancestor nodes and all parent nodes, in the one or more chains of nodes that begin with the new part node and that end in the highest level sub-assembly node, to indicate a new part identifier in all child pointers that previously pointed to the specific part node in each node in the chain.

2. The computer implemented method of claim 1, wherein at least one of the parent pointer, the ancestor pointer, and a child pointer in the set of child pointers is null.

3. The computer implemented method of claim 1, further comprising:

responsive to receiving a request to add a new part to a sub-assembly of the product, performing the request by adding a new node to the ancestry tree, identifying a parent node of the new node from the request;

adding a child pointer to the new node in the parent node; and adding a parent pointer to the parent node in the new node.

4. The computer implemented method of claim 3, further comprising:

determining a higher level ancestor from the ancestor pointer in the parent node; and changing the ancestor pointer in the new node to the higher level ancestor.

5. The computer implemented method of claim 3, further comprising:

responsive to determining that the new part is a sub-assembly, determining one or more children of the new node from the set of child pointers in the new node; and changing an ancestor pointer to the higher level ancestor in each of the one or more children of the new node.

6. The computer implemented method of claim 1, further comprising:

responsive to receiving a request to remove a current node from the ancestry tree, identifying a parent node from a parent pointer in the current node;

removing a child pointer from the current node in the parent node;

removing the parent pointer from the parent node in the current node; and changing the ancestor pointer to the current node in the current node.

7. The computer implemented method of claim 6, further comprising:

responsive to determining that the current node is a subassembly, identifying one or more children from the set of child pointers in the current node; and changing the ancestor pointer to the current node in the one or more children from the set of child pointers in the current node.

8. The computer implemented method of claim 6, further comprising:

responsive to removing the child pointer, setting the child pointer to null; and responsive to removing the parent pointer, setting the parent pointer to null.

9. The computer implemented method of claim 1, wherein the higher level sub-assembly is a highest-level sub-assembly in the ancestry tree.

10. An apparatus for managing an ancestry tree, the data processing system comprising:

a computer connected to a storage;

a program in the storage containing a plurality of instructions adapted to cause a processor of the computer to perform actions comprising:

receiving an order to build a product;

responsive to receiving the order to build the product, creating, by the processor, the ancestry tree for an order management system, wherein the ancestry tree comprises a plurality of nodes, wherein each node in the plurality of nodes represents at least one of a subassembly and a part, and each node contains a data field, a parent pointer to a parent node, one or more child pointers to one or more child nodes and an ancestor pointer to a highest level sub-assembly that contains a particular part, wherein a child pointer may point to a lower level sub-assembly node or to a part node, and wherein the highest level sub-assembly node is a last node in one or more chains of nodes beginning with the part node and ending in the highest level sub-assembly node, and wherein each node in the one or more chains of nodes contains the ancestor pointer to the highest level sub-assembly node;

responsive to a request to change a specific part to a different part, identifying, by the processor, all nodes from each specific part node to each highest level sub-assembly node in the ancestry tree that contains an ancestor pointer to the specific part;

replacing, by the processor, a specific part data in each specific part node data field with a new part data to form a new part node with a new part data field;

updating, by the processor, all ancestor nodes and all parent nodes, in the one or more chains of nodes that begin with the new part node and that end in the highest level sub-assembly node, to indicate a new part identifier in all child pointers that previously pointed to the specific part node in each node in the chain.

11. The apparatus of claim 10, wherein the plurality of instructions are further adapted to cause the processor of the computer to perform steps comprising:

responsive to receiving a request to add a new part to a sub-assembly of the product, performing the request by adding a new node to the ancestry tree, identifying a parent node of the new node from the request; and adding a child pointer to the new node in the parent node, and adding a parent pointer to the parent node in the new node.

12. The apparatus of claim 11, wherein the plurality of instructions are further adapted to cause the processor of the computer to perform steps comprising:

determining a higher level ancestor from the ancestor pointer in the parent node; and changing the ancestor pointer in the new node to the higher level ancestor.

13. The apparatus of claim 11, wherein the plurality of instructions are further adapted to cause the processor of the computer to perform steps comprising:

responsive to determining that the current node is a sub-assembly, identifying one or more children from the set of child pointers in the current node; and changing the ancestor pointer to the current node in the one or more children from the set of child pointers in the current node.

14. The apparatus of claim 10, wherein the plurality of instructions are further adapted to cause the processor of the computer to perform steps comprising:

responsive to receiving a request to remove a current node from the ancestry tree, identifying a parent node from a parent pointer in the current node;

removing a child pointer from the current node in the parent node, and removing the parent pointer to the parent node in the current node; and changing the ancestor pointer to the current node in the current node.

15. The apparatus of claim 14, wherein the plurality of instructions are further adapted to cause the processor of the computer to perform steps comprising:

determining whether the current node is a sub-assembly;

responsive to determining that the current node is a sub-assembly, identifying one or more children from the set of child pointers in the current node; and changing the ancestor pointer to the current node in the one or more children from the set of child pointers in the current node.

16. The apparatus of claim 14, wherein the plurality of instructions are further adapted to cause the processor of the computer to perform steps comprising:

responsive to removing the child pointer, setting the child pointer to null; and responsive to removing the parent pointer, setting the parent pointer to null.

17. The apparatus of claim 10, wherein a higher level sub-assembly is a highest-level sub-assembly in the ancestry tree.

18. A computer program product, comprising:

a computer usable storage medium;

a plurality of computer usable program code stored in the computer usable storage medium, the plurality of computer usable program code configured to cause a processor of a computer to perform actions comprising:

responsive to receiving an order to build a product, creating, by the processor, the ancestry tree for an order management system, wherein the ancestry tree comprises a plurality of nodes, wherein each node in the plurality of nodes represents at least one of a subassembly and a part, and each node contains a data field, a parent pointer to a parent node, one or more child pointers to one or more child nodes and an ancestor pointer to a highest level sub-assembly that contains a particular part, wherein a child pointer may point to a lower level sub-assembly node or to a part node, and wherein the highest level sub-assembly node is a last node in one or more chains of nodes beginning with the part node and ending in the highest level sub-assembly node, and wherein each node in the one or more chains of nodes contains the ancestor pointer to the highest level sub-assembly node;

responsive to a request to change a specific part to a different part, identifying, by the processor, all nodes from each specific part node to each highest level sub-assembly node in the ancestry tree that contains an ancestor pointer to the specific part;

replacing, by the processor, a specific part data in each specific part node data field with a new part data to form a new part node with a new part data field;

updating, by the processor, all ancestor nodes and all parent nodes, in the one or more chains of nodes that begin with the new part node and that end in the highest level sub-assembly node, to indicate a new part identifier in all child pointers that previously pointed to the specific part node in each node in the chain.

* * * * *